(12) United States Patent
Page

(10) Patent No.: US 7,721,685 B2
(45) Date of Patent: May 25, 2010

(54) ROTARY CYLINDRICAL POWER DEVICE

(76) Inventor: Jeffrey Page, 211 S. State College Blvd., #352, Anaheim, CA (US) 92806

( * ) Notice: Subject to any disclaimer, the term of this patent is extended or adjusted under 35 U.S.C. 154(b) by 0 days.

(21) Appl. No.: 11/483,237

(22) Filed: Jul. 7, 2006

(65) Prior Publication Data

US 2008/0006237 A1    Jan. 10, 2008

(51) Int. Cl.
F01B 3/04 (2006.01)
F01B 15/06 (2006.01)
F02B 75/18 (2006.01)

(52) U.S. Cl. .............................. 123/43 AA; 123/43 A; 123/56.8

(58) Field of Classification Search ............. 123/43 AA, 123/43 A, 56.8; 92/71, 33, 138; 91/499, 91/503; 417/269, 393

See application file for complete search history.

(56) References Cited

U.S. PATENT DOCUMENTS

| | | | | | |
|---|---|---|---|---|---|
| 1,097,150 | A | * | 5/1914 | Vallez | 123/43 AA |
| 1,229,009 | A | * | 6/1917 | Allison | 123/56.8 |
| 1,312,234 | A | * | 8/1919 | Carlson | 123/56.8 |
| 1,762,437 | A | * | 6/1930 | Franklin | 123/56.8 |
| 1,762,650 | A | * | 6/1930 | Boughton | 123/56.8 |
| 1,802,902 | A | * | 4/1931 | Brau | 123/56.8 |
| 1,867,504 | A | * | 7/1932 | Franklin | 123/56.8 |
| 1,918,840 | A | * | 7/1933 | Eriksen | 123/56.8 |
| 2,057,147 | A | * | 10/1936 | Holmes | 123/56.8 |
| 2,243,817 | A | * | 5/1941 | Herrmann | 123/56.8 |
| 2,983,264 | A | * | 5/1961 | Herrmann | 123/56.8 |
| 4,492,188 | A | * | 1/1985 | Palmer et al. | 123/56.8 |
| 4,571,946 | A | * | 2/1986 | Demopoulos | 123/56.8 |
| 4,834,033 | A | * | 5/1989 | Larsen | 123/56.8 |
| 5,209,190 | A | | 5/1993 | Paul | 123/43 AA |
| 6,718,938 | B2 | | 4/2004 | Szorenyi | |
| 6,834,636 | B2 | * | 12/2004 | Thomas et al. | 123/43 AA |
| 6,948,458 | B2 | * | 9/2005 | Ariyakunakorn | 123/43 AA |
| 2003/0070634 | A1 | | 4/2003 | Al-Hawaj | |
| 2004/0099229 | A1 | | 5/2004 | Gelfand | |
| 2004/0261731 | A1 | | 12/2004 | Fathollahi | |
| 2005/0051129 | A1 | | 3/2005 | Watkins et al. | |
| 2005/0166889 | A1 | | 8/2005 | Johnson | |
| 2005/0217636 | A1 | | 10/2005 | Turner | |
| 2005/0235947 | A1 | | 10/2005 | Watkins | |
| 2005/0284425 | A1 | | 12/2005 | Vallejos | |
| 2005/0284440 | A1 | | 12/2005 | Duncan | |
| 2006/0027207 | A1 | | 2/2006 | Hangan | |
| 2006/0048743 | A1 | | 3/2006 | Al-Hawaj | |
| 2006/0090638 | A1 | | 5/2006 | Santiyanont | |

FOREIGN PATENT DOCUMENTS

DE    733929 C   *   4/1943

(Continued)

Primary Examiner—Thai Ba Trieu
(74) Attorney, Agent, or Firm—Kenneth L. Green

(57) ABSTRACT

This invention is a cylindrical rotary power device, usable as and convertible to a rotary internal combustion engine, pump, and/or compressor. The device incorporates an ingenious design and composition utilizing bilateral symmetry to minimize power losses and maximize efficiency. It operates with a minimum of moving parts which can be manufactured at relatively low cost and readily maintained. Also, the power device of the present invention is readily converted to an internal combustion engine by merely removing the external power source and providing fuel flow and ignition charge to the cylinders.

1 Claim, 7 Drawing Sheets

FOREIGN PATENT DOCUMENTS

| | | | |
|---|---|---|---|
| DE | 2913418 A * | 10/1980 | |
| DE | 34 08 447 A1 * | 9/1985 | |
| DE | 10024228 A1 * | 11/2001 | |
| FR | 2546232 A1 * | 11/1984 | |
| JP | 62135618 A * | 6/1987 | |

\* cited by examiner

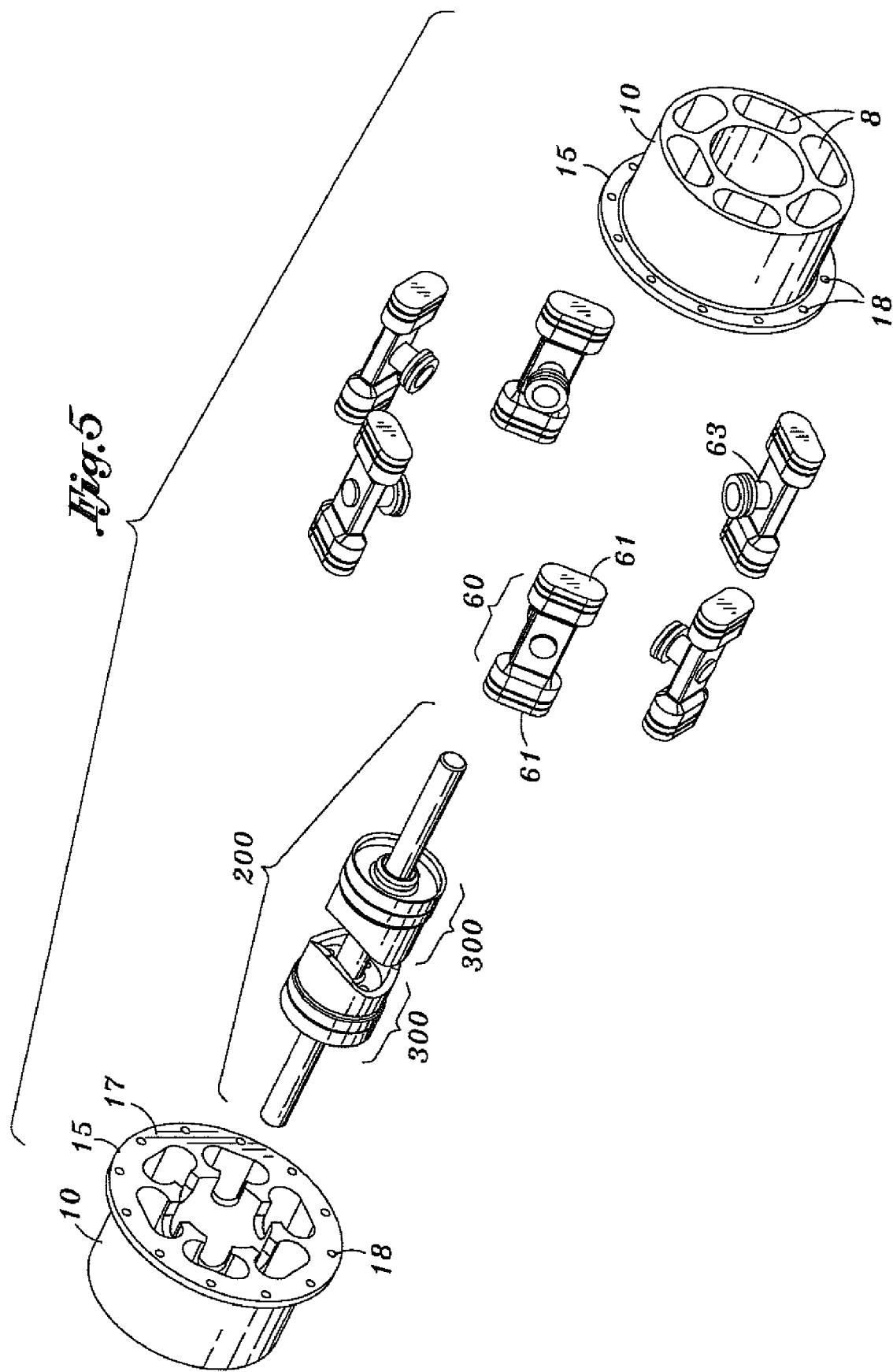

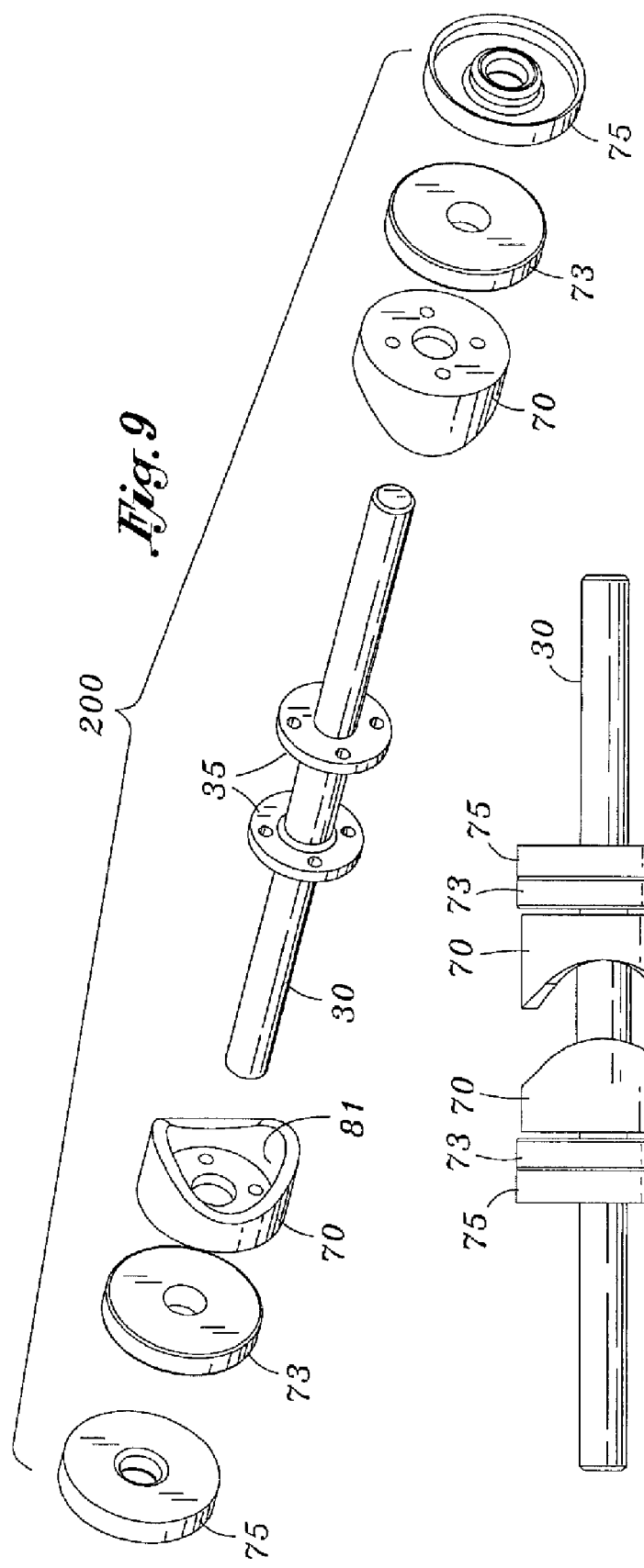

ROTARY CYLINDRICAL POWER DEVICE

FIELD OF INVENTION

This invention relates to rotary power devices and more particularly to rotary internal combustion engines, pumps and compressors.

BACKGROUND OF THE INVENTION

There have been many attempts to devise an efficient, axially aligned rotary power device. One such device was described in U.S. Pat. No. 6,601,548, which issued to inventor Al-Hawaj on Aug. 8, 2003. This device describes an array of pistons arranged around a central shaft, with a system of roller cam followers to transmit power to the central shaft.

Inventor R. Driver in US published patent application 2002/20171 (published Feb. 21, 2002) describes a rotary power displacement fluid machine, with an eccentrically mounted central rotor and an array of axially-arranged vanes.

U.S. Pat. No. 5,209,190, issued on May 11, 1993 to inventor E. Paul, describes an open-ended hosing with a central rotor assembly and parallel cylinder elements around the central shaft.

Prolific inventor R. Duncan describes a rotary machine and thermal cycle in a series of U.S. Pat. Nos. 6,782,866, 6,684,825, 6,672,275, and 6,484,687, of issue dates Aug. 31, 2004, Feb. 3, 2004, Jan. 6, 2004, and Nov. 26, 2002. This device does not use a compressive piston stroke, but instead uses and expansion ring and gear to generate pressure.

US published patent application 2005/166,889 (published Aug. 4, 2005) describes a rotary device with coupled chamber halves and a drive disk plate.

SUMMARY OF THE INVENTION

This invention is a cylindrical rotary power device, usable as and convertible to a rotary internal combustion engine, pump and compressor. The device incorporates an ingenious design and composition utilizing bilateral symmetry to minimize power losses and maximize efficiency.

It is an object of the present invention to provide a rotary power device both as an internal combustion engine and for compressing and pumping fluids.

Another object of the invention is to provide an improved rotary air compressor which maximizes output as compared to conventional pumps and compressors.

Another object of the invention is to provide in a single unit an engine and a compressor.

Another object of the invention a rotary power device which is readily convertible between an internal combustion engine and a pump or compressor.

Another object of the invention is to provide a rotary power device having relatively few parts.

Still another object of the invention is to provide a rotary power device having valveless ports which are substantially equal in diameter to the diameter of the pistons of the rotary device so as to reduce resistance to fluid inflow and outflow.

These and other objects and advantages of the present invention will be apparent from the following detailed description and from the recital of the appended claims, particularly when read in conjunction with the accompanying drawings.

BRIEF DESCRIPTION OF THE DRAWINGS

FIG. 5 comprises an exploded perspective view of the major components of the power transfer device of FIG. 1;

FIG. 9 displays an exploded perspective view of the crankshaft and power train of the power transfer device designed in accordance with the present invention;

FIG. 10 demonstrates a side view of the assembled power train of FIG. 9; and,

FIG. 11 displays a side view of the assembled power train of FIG. 10, and rotated 90 degrees therefrom.

DETAILED DESCRIPTION OF THE INVENTION

In the accompanying FIGS. 1-11, for the purposes of illustrating the principals of this invention, there is disclosed a rotary power generation and transfer device. It will be understood, that various features of this invention, particularly the input and output of the reciprocating pistons and the translation of reciprocating motion to rotary motion and vice versa, have utility and may be successfully employed with a variety of operational devices, as for example, with pumps, steam engines, internal combustion engines, and the like.

Figure 1:
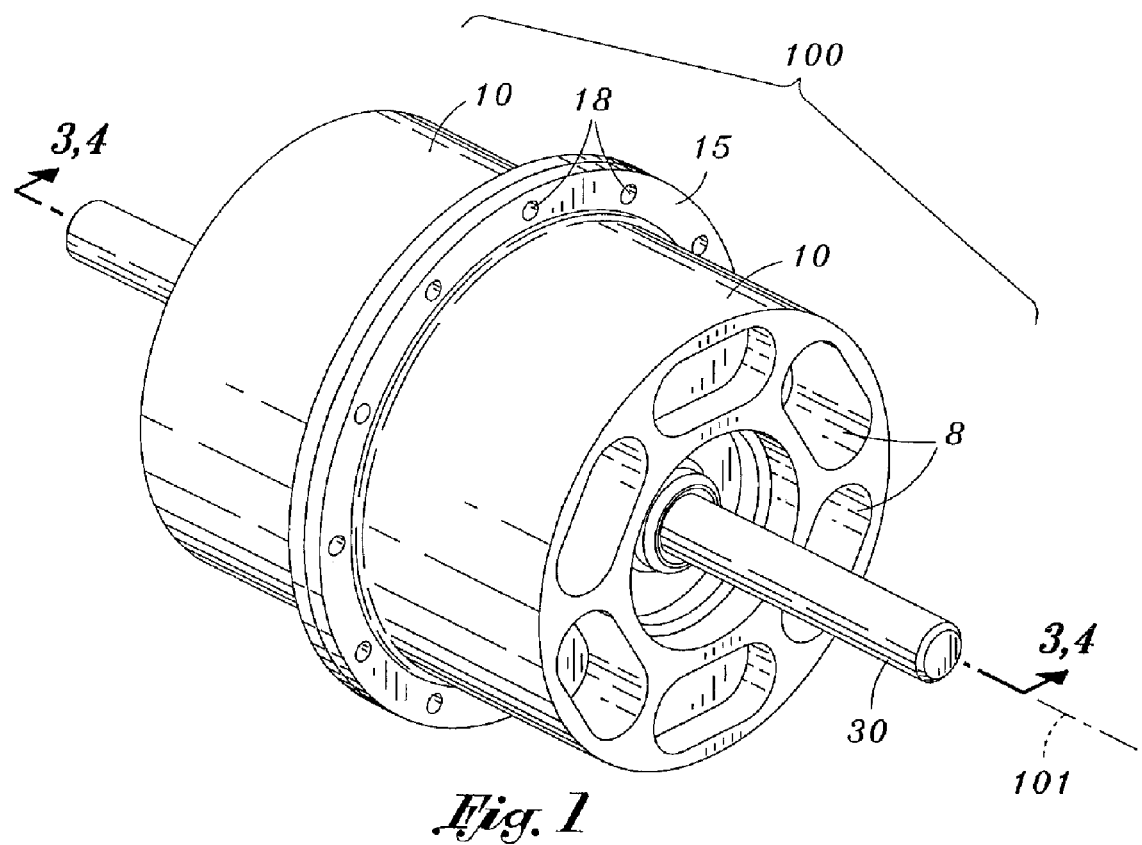
FIG. 1 reveals a perspective view of a rotary power transfer device designed in accordance with the present invention and having a portion of the outer housing cut away for purposes of illustration.
Figure 2:
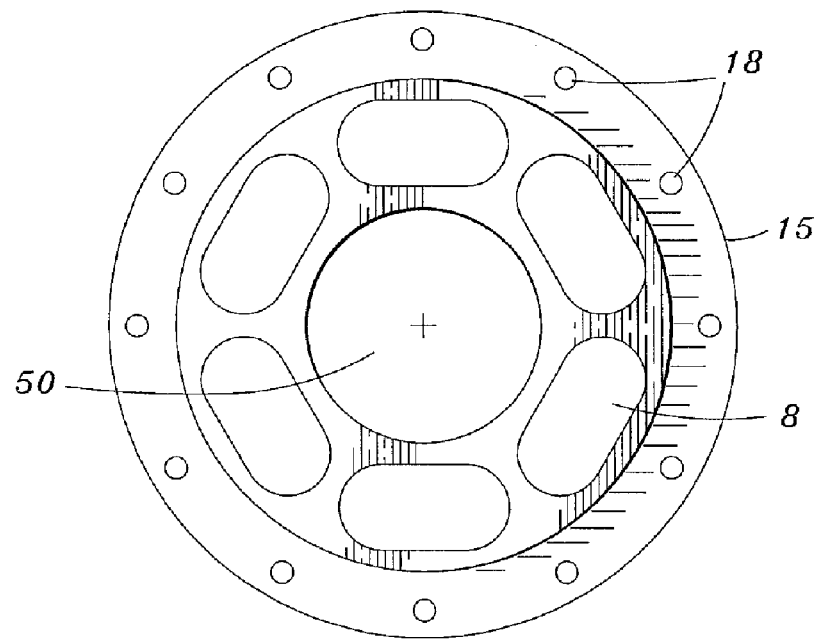
FIG. 2 displays a frontal view of the outer face of the power transfer device of FIG. 1.
Figure 3:
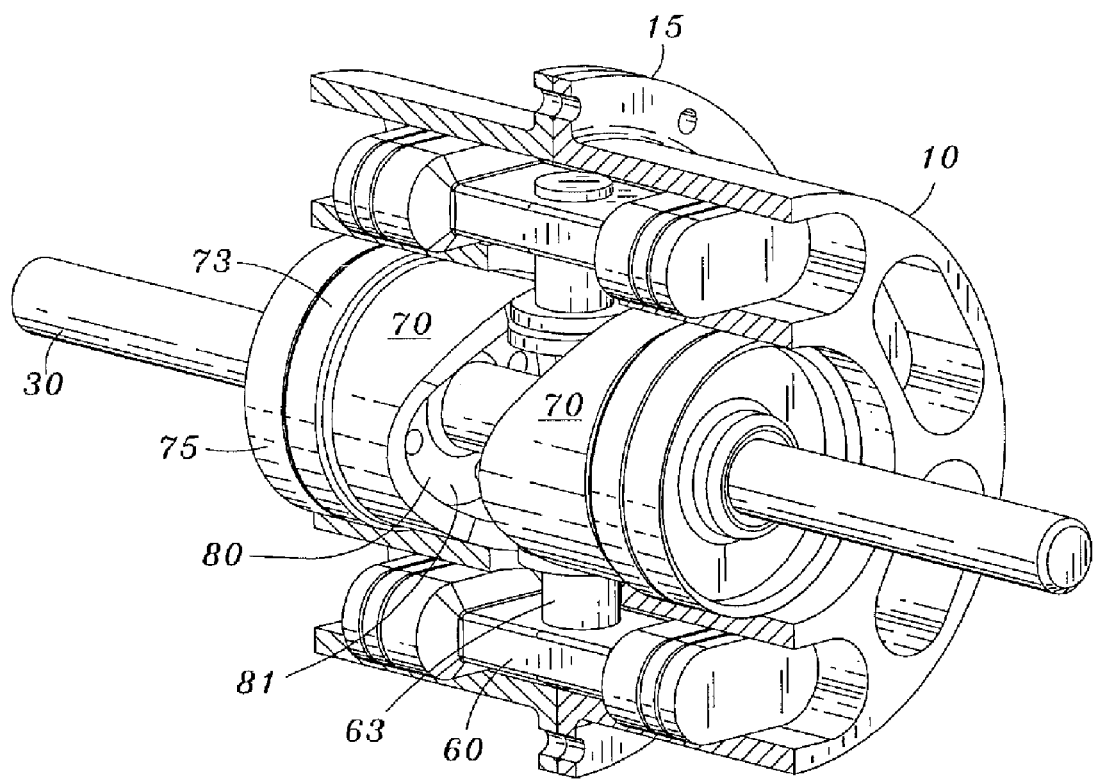
FIG. 3 indicates a perspective view taken along line 3-4 of FIG. 1.
Figure 4:
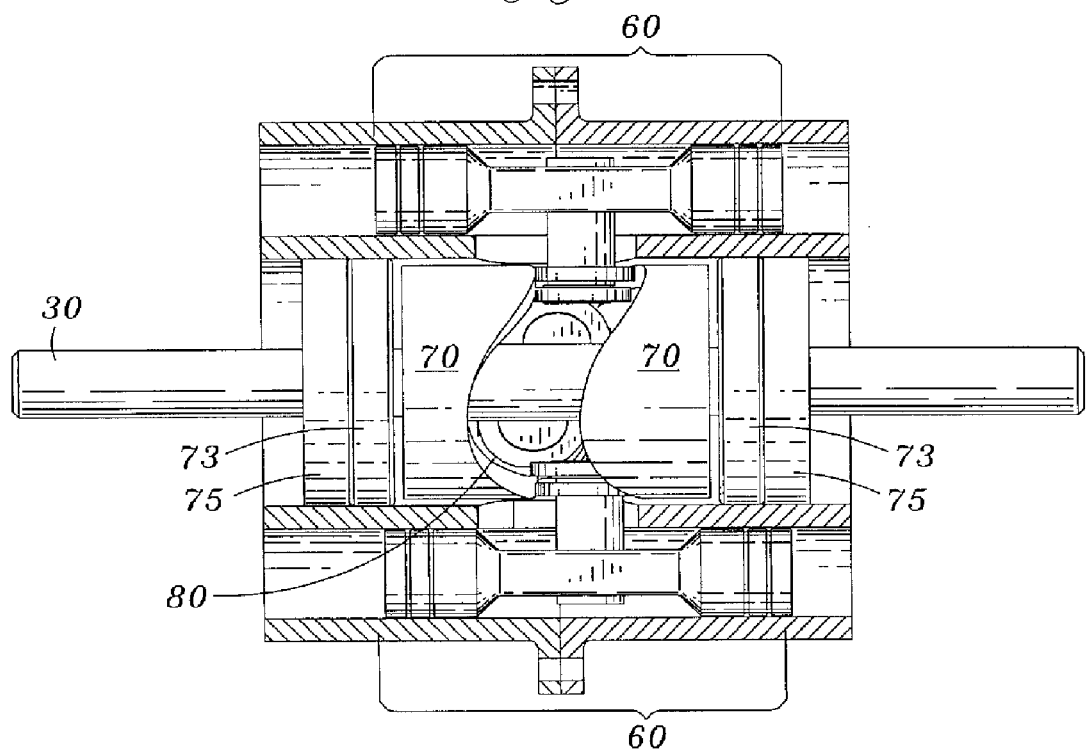
FIG. 4 indicates a side sectional view taken along line 3-4 of FIG. 1.
Figure 4A:
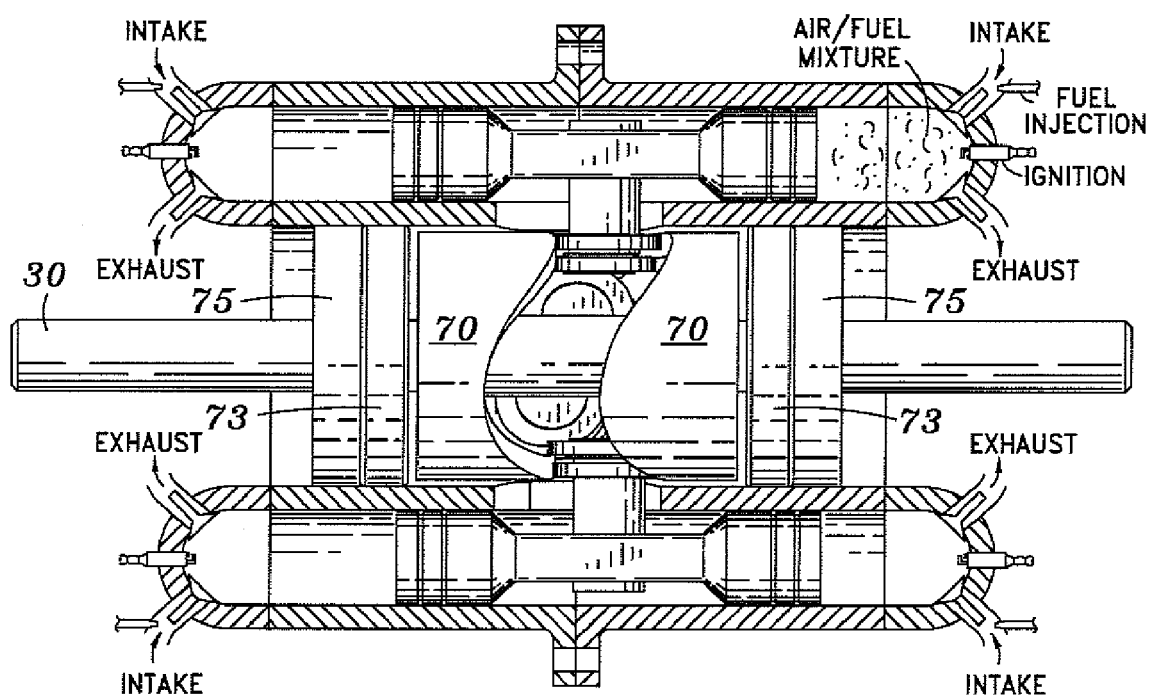
FIG. 4A indicates a side sectional view of a preferred embodiment of the current invention which comprises an internal combustion engine taken along line 3-4 of FIG. 1.
Figure 4B:
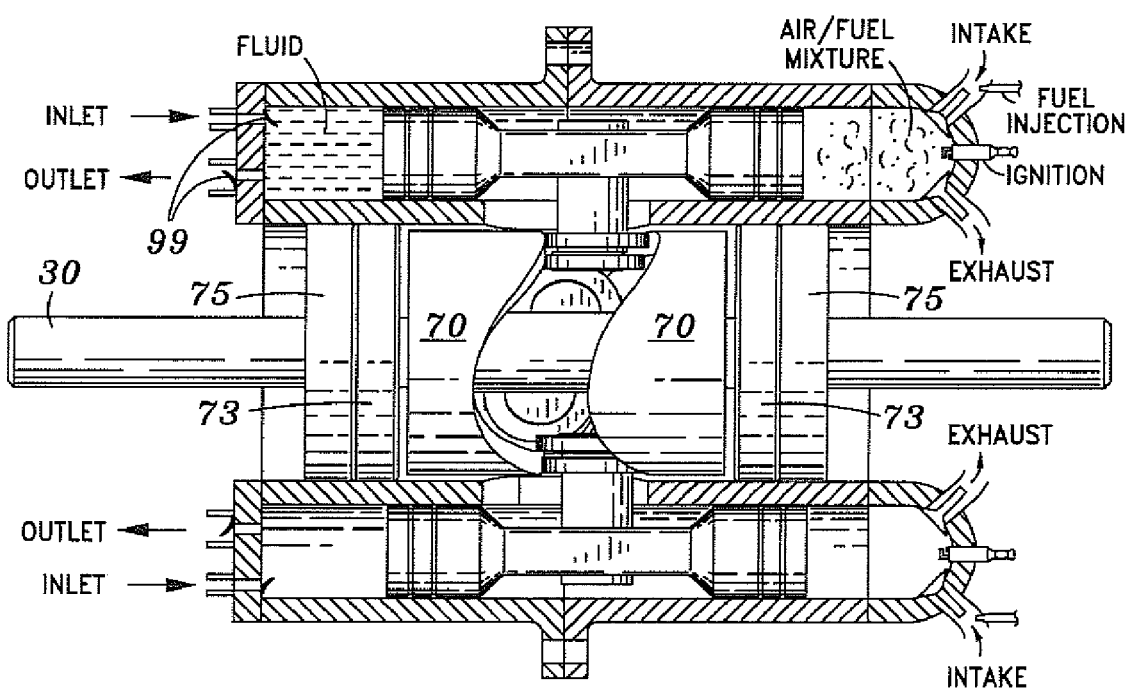
FIG. 4B indicates a side sectional view of a referred embodiment of the current invention which comprises an internally powered pump taken along line 3-4 of FIG. 1.

Referring to FIGS. 1-11, the rotary power device of the present invention, shown generally as 100, includes an outer piston and cylinder block assembly, an inner power train sleeve, and a crankshaft. The crankshaft can be rotatably powered by the pistons, acting in an internal combustion engine mode as shown in FIGS. 4A and 4B. Alternatively, the crankshaft can be externally powered from an external power source (not shown), thereby powering the cylinders in a reverse mode as shown in FIG. 3. Powered in this fashion, the current invention can operate as a pump.

A perspective view of the outer surface of the preferred embodiment of the current invention is displayed in FIG. 1. Seen in this figure is the basic piston and cylinder block of the current invention, arranged in a preferred cylindrical array. The block itself is comprised of two similar or identical half-blocks 10, which mate together at their bases via a component central ring 15. A series of apertures 18 appear around the ring. These are disposed for placement of bolts or other connectors to join the halves 10 together to form a completed block. Inside the block is the crankshaft 30, axially disposed along the centerline of the block.

FIG. 2 displays the block 10 from an end-on view. The block 10 contains a variety of apertures comprising cylinders 8, fastener apertures 18, and large central aperture 50. The cylinders 8, of course, are the housings for the pistons, as shown in later figures. The central aperture 50 is the home of the power train, also shown later. A total of 6 cylinders, and thus 6 pistons are displayed, although other numbers, for instance 4 or eight cylinder and piston pairs are contemplated.

It will be noted that these cylinders 8 have an oval cross section. This is not required, and other geometric shapes, for instance a circular cross section, are contemplated. However, tests have indicated that the oval shape provides better power per cylinder bore size, and thus is preferred in the current embodiment of the present invention.

FIG. 3 reveals an open sectional view of the current invention, with both cylinder block and power train components on display. Two of the pistons 60 are shown, in operational position. These are connected to the power train by bearing pins 63. The power train comprises crankshaft 30, bearing seals 75, bearings 73, and power sleeves 70. The two power sleeves 70 do not connect, but instead are separated by a curved power track 80 which has constant width. As the pistons move up and down within their cylinders, they are connected to the power train via the bearing pins 63 which mate to the curved power track 80. Thus crankshaft 30, if externally powered as shown in FIG. 3 can transmit power via the curved power track 80 and pins 63 in reverse direction, forcing pistons 60 to move up and down. This is useful, for instance, to create a pump. Alternately, if the pistons are operating in internal combustion mode, as illustrated in FIG. 4A, they will transmit power via pins 63 to track 80, forcing curved power track 80, power sleeves 70, and the entire power train including crankshaft 30 to rotate around the long axis or if operating on one side as in FIG. 4B the opposing side can be utilized as a pump. Power sleeves 70 have a hollow cylindrical body portion 81 shown in FIGS. 3, 5, and 9

FIGS. 4A and 4B demonstrate the same section view of FIG. 3, from a side plan view when the pistons are operating in internal combustion mode. In contrast to FIG. 4A, in which the engine portrayed is operating in this mode on all cylinders, FIG. 4B shows an embodiment of the invention in which the right hand side of the engine is operating in internal combustion mode, and the left hand is acting as a pump, or compressor, with check valves 99 to prevent backflow. Both upper and lower pistons 60 are shown, each in a position approximately halfway up the cylinder. The bearing pins 63 are shown, connecting each piston 60 to the curved power track 80 formed by the adjacent power sleeves 70. The power sleeves are greeted on their outer faces by bearings 73, which aid in holding the power sleeves in place, and thus preserving the curved power track 80. Outside of bearings 73 are bearing seals 75, which seal off the power sleeves and bearings from the outside, thus excluding contaminants and preserving lubricant. The entire assembly is typically lubricated by a charge by a charge of lubricating oil, which circulates via ports between the cylinder walls, pistons, bearings, power sleeves, and crankshaft.

FIG. 5 introduces an exploded view of the preferred embodiment 100 of the current invention. At either end are the two unit halves 10 of the cylinder block. Shown on the right side block is the outer face of one block unit half 10, as it appears in earlier figures. Displayed on the left side unit block half is the inner face 17, which faces the interior of the current invention.

The pistons 60 that normally reside within cylinders 8 are shown in exploded view in this figure. The pistons are in approximately the arrangement they will hold when in position within the cylinders. Each piston has a bearing pin 63 which is disposed at right angles to the piston, and intersects the piston at the midsection, in between the piston heads 61. Each bearing pin 63 has a top bearing ring 65, to secure the pin on one side of the piston, and a pair of bearing pins 67 on the opposite side of the piston.

Also shown in FIG. 5 is the power train 200 of the current invention. In simplified, assembled form, the power train comprises a pair of power bearing assemblies 300 separated by a curved power track 80, and surrounding a crankshaft 30.

It can be seen from this exploded view, in combination with the views of earlier figures, especially FIGS. 4A and 4B, how the pistons 60 connect with the power train 200 to transmit power to the crankshaft. The pistons are connected by bearing pins 63, which culminate in a pair of bearing rings 67. This pair of rings can fit inside curved power track 80, or be disposed with one ring inside and one just outside the track. This secures the connection to the power train, as the curve is comprised by power sleeves 70, which are themselves connected to (or integrally part of) crankshaft 30.

Figure 6:
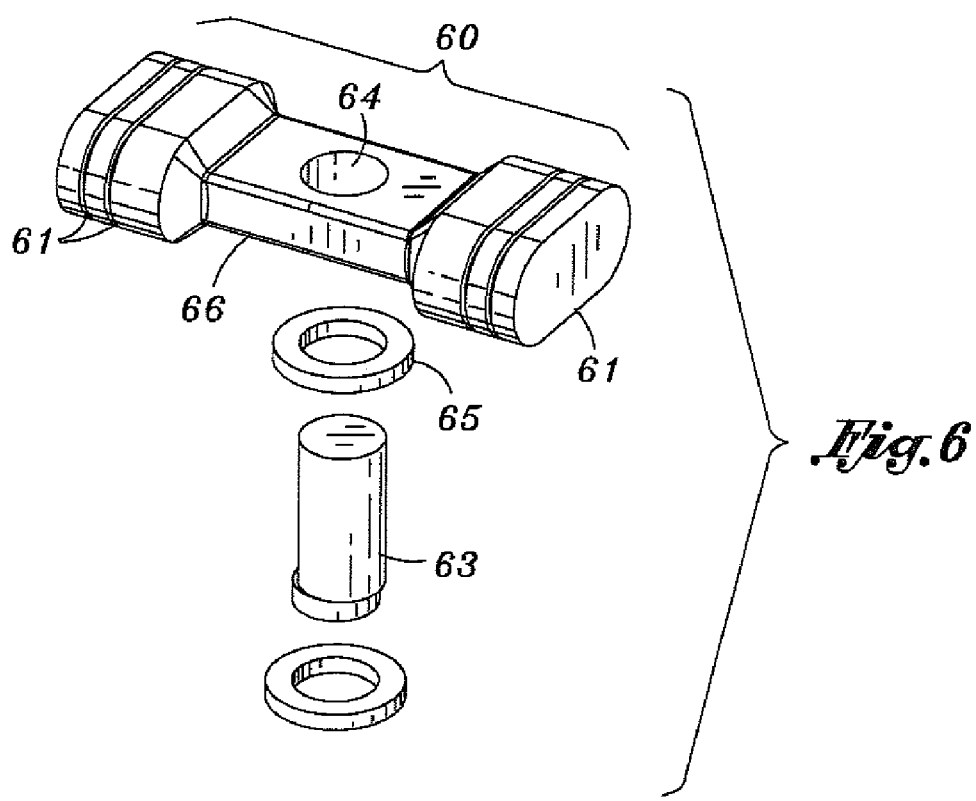
FIG. 6 comprises an exploded perspective view of a piston and bearing connector of the power transfer device designed in accordance with the present invention.

Now moving to FIG. 6, a piston and bearing pin assembly is displayed in exploded view. The piston 60 is comprised of two large piston heads 61, and a thin central body 62, with an aperture 64 at its midpoint. The piston heads 61 are oval in cross section, and are designed to fit closely within a cylinder 8. Piston heads 61 are circumscribed by grooves 66 for lubricating oil.

Bearing pin 63 is designed to closely fit within piston midpoint aperture 64. Each piston has one associated bearing pin 63, one upper bearing ring 65, and two lower bearing rings 67. The upper bearing ring 65 prevents pin 63 from escaping the piston 60 at one end. The lower pair of bearing rings 67 connect the bearing pin 63 to curved power track 80, and secure the bearing pin 63 thereto.

Figure 7:
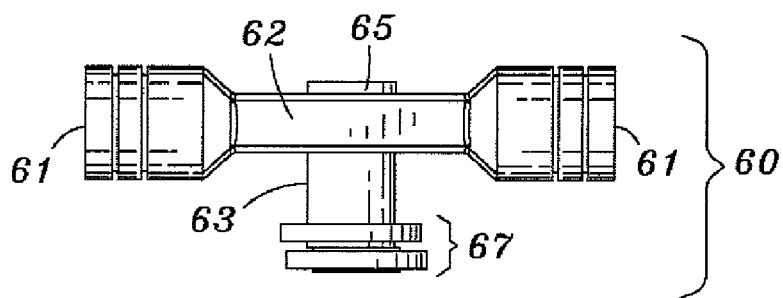
FIG. 7 demonstrates a side view of the assembled piston from the parts shown in FIG. 6.

FIG. 7 illustrates the completed piston and bearing pin assembly 600 from a side view. The piston 60 is shown to be symmetrical in shape, with dual piston heads 61. Piston 60 is intersected at a right angle by bearing pin 63. Pin 63 has bearing ring 65 secured at its top end, and a pair of bearing rings 67 secured at its bottom end. It should be noted that bearing rings 67 could be identical with bearing ring 65, except for their association as a pair, and their function to connect pin 63 to the curved power track 80.

Figure 8:
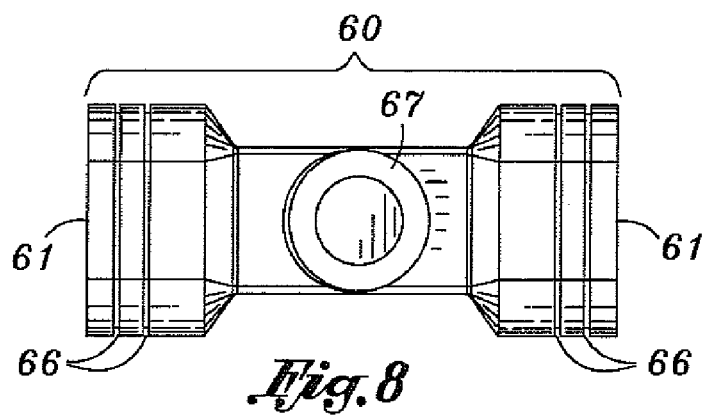
FIG. 8 indicates a view from the perspective of the crankshaft of the assembled piston of FIG. 7, and rotated 90 degrees therefrom.

FIG. 8 shows the same completed piston and bearing pin assembly 600 from a view 90 rotated from FIG. 7. This view is from the direction of the power train 200.

FIG. 9 displays the power train assembly 200 in exploded view. The bilateral symmetry of the power train is evident, as indeed is reflected in the same symmetry of the invention 100 as a whole. The elements of power train 200 are shown, starting with crankshaft 30, which contains a pair of mounting brackets 35 on either end of the midpoint. These mounting brackets 35 are each fastened to the inner face of a power sleeve 70. This disposes the power sleeves in the correct relationship to establish curved power track 80.

Power sleeves 70 are connected at their respective outer faces to bearings 73. These help distribute the weight and load of the power train. At the other, outer sides of bearings 73 are placed seals 75. As noted above, the seals prevent outer contamination and seal the power train off from the outside, excepting crankshaft 30, which communicates to a drive train for powering a vehicle or motor, perhaps, or for accepting power from an external source.

When the current invention operates as an internal combustion engine, it will include fuel injection means at intake ports of each cylinder for the delivery of a fuel to open ends of said cylinder elements as they rotate. Also, there will be means for initiating ignition of said air fuel mixture after it is compressed within said cylinder element, such as a spark ply appurtenant to each cylinder. Additionally, there will be an exhaust manifold communicating with each of a set of outlet ports on each cylinder, for receiving combustion products from said cylinder elements during the exhaust stroke of said pistons.

FIG. 10 illustrates the completed power train assembly 200 from a side view. Curved track 80 is clearly shown at the center of the figure, bowed to the right in this view. The elements of the crankshaft 30, power sleeves 70, bearings 73, and seals 75 are displayed.

FIG. 11 shows the same completed power train assembly 200 from a view 90 degrees rotated from FIG. 10. This view shows the curved power track 80 bowed to the left, and illustrates the up-and-down sinusoidal-like motion of curved power track 80. This is necessary, as the curved power track must meet up with itself on completing the circumference of the power train.

It should be noted, however, that curved power track 80, though necessarily having a repeating path, can define a steeper or less steep curve. The steeper the curve, the longer the piston 60 travel path within cylinder 8, and thus the higher compression can be reached. However, the curved power track 80 is limited by the physical dimensions of piston 60 and cylinder 8. Thus, larger and longer cylinders and pistons will be accommodated by steeper curved power tracks 80. The steepness of the curve is defined by the shape of the inner face 77 of power sleeves 70.

It will be understood that in the example set forth above, that the stroke and compression ratio can be increased by lengthening the slot curved power track 80 of the power train so that the output of air is at a higher pressure than 160 pounds. The dimensions of the bore of the cylinder 8 and the dimensions of the pistons 60 can be increased to increase the output of compressed air. Likewise, the size of the device can be increased and the number of cylinder elements and pistons may be increased, for example from 4 to 8 cylinder elements. However, the pump can operate effectively with as few as two cylinder elements.

The apparatus described herein produces a highly efficient compressor and/or pump for compressing or moving fluids. It operates with a minimum of moving parts which can be manufactured at relatively low cost and readily maintained. Also, the power device of the present invention is readily converted to an internal combustion engine by merely removing the external power source and providing fuel flow and ignition charge to the cylinders.

As will be understood by those skilled in the art, various arrangements other than those described in detail in the specification will occur to those persons skilled in the art, which arrangements lie within the spirit and scope of the invention. It is, therefore, to be understood that the invention is to be limited only by the claims appended hereto.

I claim:

1. A power train assembly in a rotary power device (100) having a stationary block (10) having a central axis (101), said block (10) supporting an axially disposed, rotatable crankshaft (30), a plurality of axially oriented spaced cylinders (8) formed within said block (10), said rotatable crankshaft (30) supporting a curved track (80), a plurality of dual headed pistons (60) slidingly supported in each of said axially oriented spaced cylinders (8), each piston (60) supporting a cam follower pin (63) which extends radially inwardly and terminating in a cam follower member (67) riding in said curved track (80) so that as the curved track (80) rotates with respect to said block (10), the pistons (60) oscillate in the cylinders as said cam follower members (67) ride in said curved track (80) wherein the improvement of said power train assembly comprises:

the curved track being formed by two adjacent separate opposing power sleeves (emphasis added);
wherein one/each of said two power sleeves having a hollow cylindrical body portion spaced from said rotatable crankshaft and being secured to said rotatable crankshaft on an inner surface of a power sleeve on an outer surface of one of a pair of mounting brackets which are axially and rotationally fixed to said rotatable crankshaft, and
wherein said one/each of the power sleeves (70) forms one half of said curved track.

* * * * *